Figures 1, 2:
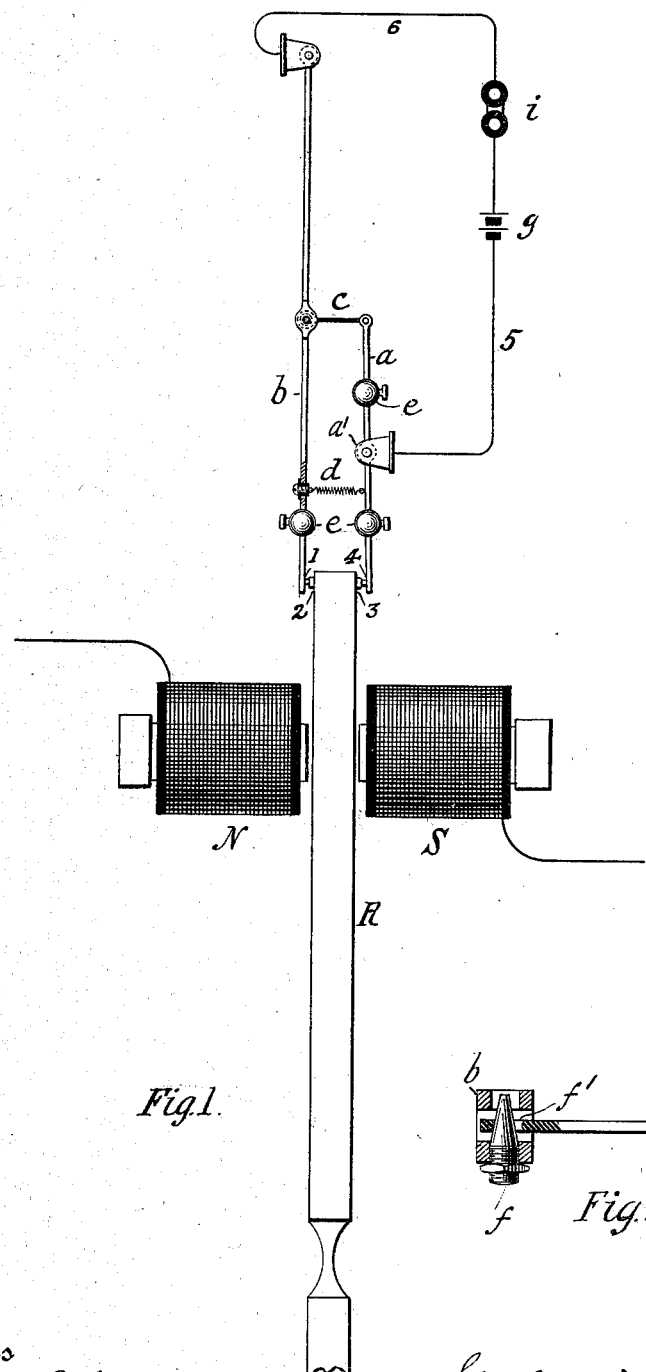

No. 734,689. PATENTED JULY 28, 1903.
S. D. FIELD.
VIBRATORY TELEGRAPHY.
APPLICATION FILED DEC. 18, 1902.
NO MODEL.

Witnesses
Frank S. Obre
Waldo M. Chapin

Inventor
Stephen D. Field
By his Attorney

No. 734,689.

Patented July 28, 1903.

UNITED STATES PATENT OFFICE.

STEPHEN DUDLEY FIELD, OF STOCKBRIDGE, MASSACHUSETTS.

VIBRATORY TELEGRAPHY.

SPECIFICATION forming part of Letters Patent No. 734,689, dated July 28, 1903.

Application filed December 18, 1902. Serial No. 135,689. (No model.)

*To all whom it may concern:*

Be it known that I, STEPHEN DUDLEY FIELD, a citizen of the United States, residing at Stockbridge, in the county of Berkshire and State of Massachusetts, have invented certain new and useful Improvements in Vibratory Telegraphy, of which the following is a full, clear, and exact description.

In organizing receiving apparatus for vibratory telegraphs it has been the common practice to mount near the vibrating medium a loosely-pivoted lever, the free end of which by colliding with a contact-point on said vibrating medium serves to close the circuit of a local battery and sounder or other receiving apparatus. Under certain conditions such an organization of apparatus is operative; but under very delicate adjustment the contacts have a tendency to weld, while with vibrations of extreme slowness—say sixteen complete waves per second—great difficulty is experienced in making an adjustment which will open during the reception of vibrations and at the same time be quick enough in action to close promptly upon their cessation.

In the present invention I show an assemblage of parts consisting of two levers reacting on each other in such manner that each movement of the vibratory medium either backward or forward is accompanied by a break in the local circuit, the break in one direction being continued until that in the other is established, with the result that the local circuit is held continuously open during the receipt of the vibratory currents. I also provide means whereby latitude of movement is allowed the vibratory element to compensate for slight movements caused by vagrant or other non-operative currents. The apparatus is adapted to any form of vibrating medium, whether tuned to harmonic vibrations or neutral, and as such responsive to any sequence of pulsations.

In the drawings, Figure 1 represents the invention somewhat conventionally, and Fig. 2 a detail thereof.

R is a vibrating reed, serving as an example of any mechanical device adapted to be vibrated by the effect of received vibrating currents. It is controlled by its normal rate of periodicity and actuated by the electromagnetic coils N S when traversed by currents of the proper sequence.

2 and 3 are contacts mounted on opposite sides of the reed and electrically connected through the body of the reed or otherwise.

$a$ and $b$ are two levers embracing between their free ends that portion of the reed carrying the contacts. Said levers have corresponding contacts, 1 being opposite 2 and 4 opposite 3. Lever $a$ is pivoted about midway of its extremities at $a'$, while lever $b$ is considerably longer than $a$ and is pivoted at one end, being connected near its middle point with the extremity of $a$ through a link $c$. In consequence of this interconnection a movement of the free end of one lever is accompanied by a motion in an opposite direction of the other. The free ends of the levers are normally drawn toward each other by a light insulated spring $d$. For the purpose of obtaining a pendulum-action of the levers weights $e$ are placed thereon and made adjustable in distance from the fulcrums. In practice the adjustment should be such that the rate of swing of the lever system is a little slower than the normal rate of vibration of the reed. The joint between link $c$ and one of the levers provides for slight independent movement of the levers and is shown fully in Fig. 2, wherein the connecting-pin $f$ is conical and adjustable lengthwise through a large hole $f'$ in the link. The adjustment of the pin determines the freedom of movement and permits the levers to "rattle" without communicating motion from one lever to the other. The local circuit contains the battery $g$ and the receiving device $i$ of suitable character and is normally closed through wire 5, lever $a$, contacts 4 3, the reed, contacts 2 1, lever $b$, and wire 6, link $c$ being of insulating material.

The operation is as follows: Normally both pairs of contacts are held together by spring $d$. Upon receipt of operative vibratory currents which traverse the coils the reed vibrates. On the movement to the right, contacts 3 and 4 being together, lever $a$ will transfer reverse motion to lever $b$ via link $c$, and contacts 1 2 will open the local circuit. When the reed has completed its excursion to the right and commenced its return movement, the momentum acquired by weights $e$ will continue the movement of the levers, and contacts 3 4 will separate, thus breaking the local circuit in another place and preventing its reëstablishment when contacts 1 2 collide. When the reed strikes $b$, 3 4 are continued apart and so remain until the return of the reed, when they collide while 1 2 are yet open. Thus as long as the vibrations continue the local circuit remains open; but when they cease the spring $d$ immediately closes all contacts and completes the circuits. The receiving device $i$ indicates or records the periods during which vibrations occur.

It will be obvious from the foregoing description that stray or vagrant currents, which are usually manifested in weak vibrations, will not be likely to open the local circuit, since the lost motion provided in the joint $f f'$ will enable the spring to keep the contacts against the reed. It will also be obvious that while the description of my invention has dealt with a normally closed local circuit the apparatus is readily adapted to control a normally open circuit, in which case the vibrations of the reed would serve to close the circuit during their occurrence.

Having described my invention, I claim—

1. The combination of a vibratory element, an electric circuit, and a circuit-controller actuated by said vibratory element and adapted to alter the normal condition of said circuit with respect to continuity and maintain such alteration during the vibration of the vibratory element.

2. In a signaling system, a receiving apparatus consisting of the combination of a vibratory element, a local circuit containing suitable receiving devices and a circuit-controller actuated by said vibratory element and adapted to alter the normal condition of said circuit with respect to continuity and maintain such alteration during the vibration of the vibratory element.

3. The combination of a vibratory element, an electric circuit controlled thereby and including in series a plurality of pairs of separable terminals and means actuated by the vibratory element for always having at least one pair of said terminals in series separated during the vibration of the vibratory element, substantially as described.

4. In vibratory telegraphy, the combination of a vibratory element, an electric circuit and a plurality of interconnected levers moved successively by the vibratory element and each adapted to open the circuit when moved by the other.

5. In vibratory telegraphy, the combination of a vibratory element, an electric circuit and a plurality of interconnected levers moved successively by the vibratory element and each adapted to open the circuit when moved by the other, and means whereby the levers will tend to continue their motion after being started.

6. In vibratory telegraphy, the combination of a vibratory element, two levers making independent contact with opposite sides of said element and a local circuit including a receiving device, levers and vibratory element, said levers being so interconnected that their motions are in opposite directions.

7. In vibratory telegraphy, the combination of a vibratory element, two levers making independent contact with opposite sides of said element, a local circuit including a receiving device, levers and vibratory element, said levers being so interconnected that their motions are in opposite directions and means for imparting a pendulum-motion to the levers.

8. In vibratory telegraphy, the combination of a vibratory element, an electric circuit and a plurality of interconnected levers moved successively by the vibratory element, and each adapted to open the circuit when moved by the other and means whereby said levers will have limited motion independent of each other.

In witness whereof I subscribe my signature in presence of two witnesses.

STEPHEN DUDLEY FIELD.

Witnesses:
F. F. CORLISS,
CHAS. E. HULL.